W. V. TURNER.
FLUID PRESSURE BRAKE.
APPLICATION FILED NOV. 25, 1913.
1,134,426.
Patented Apr. 6, 1915.
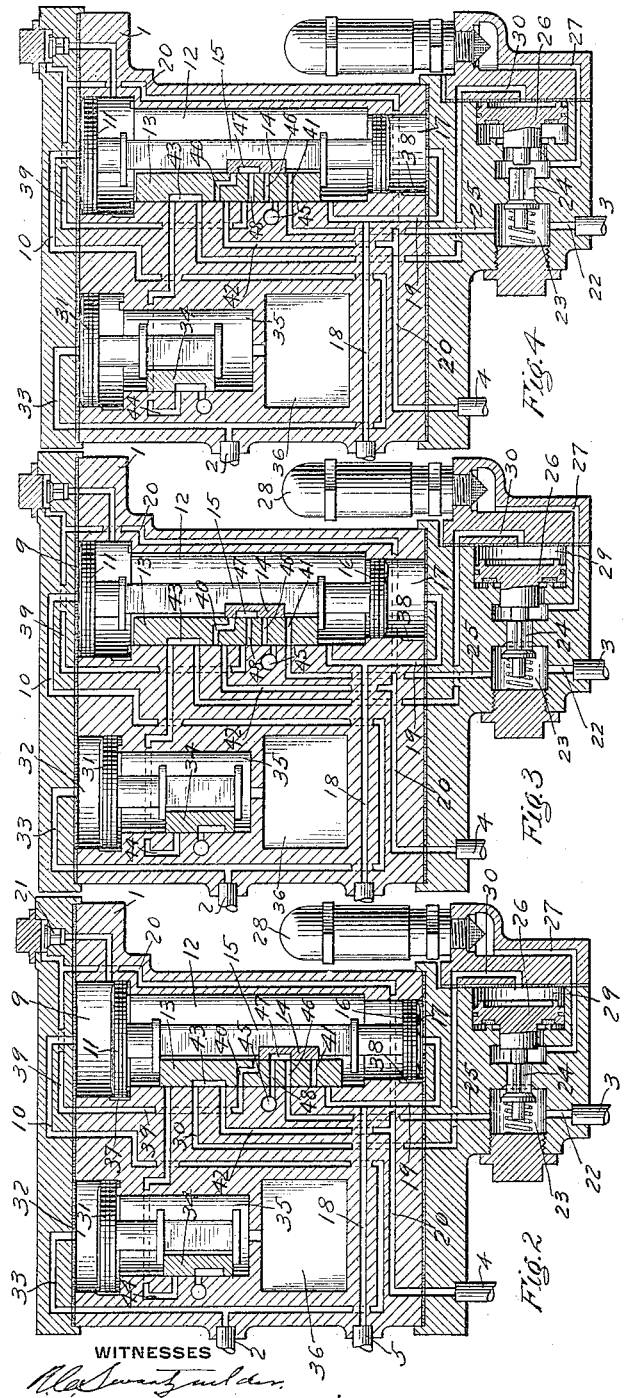
WITNESSES
INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,134,426.  Specification of Letters Patent.  Patented Apr. 6, 1915.

Application filed November 25, 1913.  Serial No. 802,915.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to a valve mechanism for graduating the release of the brakes.

It has heretofore been proposed to employ a supplemental reservoir normally charged with fluid under pressure from which fluid is discharged into the valve chamber of the equalizing valve device for raising the pressure therein after the equalizing piston has been shifted to release position by a gradual increase in brake pipe pressure. This increase in pressure then operates to shift the equalizing piston and the valve which controls the exhaust of fluid from the brake cylinder, so as to close the exhaust and thus permit of a partial release of the brakes.

In order to provide a small volume for the supplemental reservoir pressure to vent into, it has been proposed to substantially cut off the auxiliary reservoir from the valve chamber in graduating the release, thus permitting the use of a smaller supplemental reservoir and a corresponding more positive action of the parts.

The principal object of my invention is to provide an improved valve device of the type having the above mentioned characteristics.

In the accompanying drawing; Figure 1 is a diagrammatic view of a car air brake equipment with my invention embodied therein; Fig. 2 a central sectional view of a brake controlling valve device with my improvements applied thereto, showing the parts in normal release position; Fig. 3 a similar view, showing the parts in service application position; and Fig. 4 a similar view, showing the parts in emergency application position.

As shown in Fig. 1 of the drawing, the car air brake equipment may comprise a brake controlling valve device 1 connected to brake pipe 2 and connected by pipes 3, 4, and 5 respectively to brake cylinder 6, supplemental reservoir 7, and service reservoir 8.

The brake controlling valve device 1 may comprise a casing having a piston chamber 9 connected to brake pipe 2 by passage 10 and containing piston 11 and a valve chamber 12 containing main slide valve 13 and graduating slide valve 14 mounted on and having a movement relative to the main slide valve. The piston 11 operates the valves 13 and 14 through piston stem 15 and the inner end of said piston stem carries a piston 16 contained in piston chamber 17.

The service reservoir pipe 5 is connected by passage 18 to a passage 19 which leads from the seat of main slide valve 13 to piston chamber 17 and the supplemental reservoir pipe 4 is connected to passage 20 containing check valve 21 and opening into piston chamber 9. The brake cylinder pipe 3 is connected to a passage 22 opening into chamber 23 containing cut-off valve 24 and said chamber is open to a passage 25 leading to the seat of main slide valve 13. The cut-off valve 24 is adapted to be operated by piston 26 for controlling communication from chamber 23 to passage 27 leading to a safety valve 28. Piston chamber 29 at the outer face of piston 26 is connected to a passage 30 leading to the seat of main slide valve 13.

An emergency valve mechanism is also employed comprising a piston 31 contained in piston chamber 32 connected by passage 33 to the brake pipe 2 and a slide valve 34 contained in valve chamber 35 and adapted to be operated by piston 31. The volume of valve chamber 35 is preferably increased by connecting a chamber 36 thereto.

In operation, fluid supplied to the brake pipe 2 flows through passage 10 to piston chamber 9, shifting the piston 11 to normal release position, and thence through feed groove 37 to valve chamber 12. In the release position, piston 16 opens a feed groove 38 so that fluid is charged into the service reservoir 8 through passages 19 and 18. The supplemental reservoir 7 is charged directly from the brake pipe through passage 20, lifting check valve 21, and also through passage 39 and a port 40 in main slide valve 13.

If a service application of the brakes is desired, a gradual reduction in brake pipe pressure is made and the piston 11 is thereupon shifted to application position, as shown in Fig. 3 of the drawing. It will be noted that while the piston 16 cuts off communication from the service reservoir to the valve chamber 12 except through the restricted feed groove 38, the service reservoir pressure acting on said piston assists the movement of the parts to application position so that the movement is not dependent on fluid in the small volume of the valve chamber. Furthermore, the feed groove 38 is cut off upon the initial movement of piston 16 from release position, so that equalization of service reservoir pressure into the valve chamber 12 is prevented.

In application position, the service reservoir passage 19 is open to valve chamber 12 and thus fluid from the service reservoir is supplied to the brake cylinder through the usual service port 41.

In release position, the cut-off valve piston 26 is held to its outer seat by supplemental reservoir pressure supplied to the piston chamber 29 through passage 20, passage 42, cavity 43 in main valve 13, and passage 30, so that the cut-off valve 24 is maintained in open position and in application position, the passage 30 is connected by cavity 43 to passage 44 leading to the seat of the emergency slide valve 34. As the passage 44 is closed by slide valve 34 in service, the fluid pressure in piston chamber 29 is bottled up and the piston 26 is maintained on its outer seat.

If a partial or graduated release is desired, a gradual increase in brake pipe pressure is made and the equalizing piston 11 is thereby shifted to release position in which the brake cylinder is open to the exhaust port 45 through passage 25, port 46, cavity 47 in the graduating valve and port 48 and at the same time fluid from the supplemental reservoir flows to valve chamber 12 through passage 20, passage 39, and port 40. The increase in pressure thus produced in valve chamber 12 acts on the differential area of piston 11 and operates to shift said piston and the graduating valve 14 so as to close the port 40 and cut off the exhaust from the brake cylinder. The brake cylinder pressure may, in a similar manner, be further reduced by making further gradual increases in train pipe pressure as desired, the piston 11 operating the graduating valve 14 between release and release lap positions as hereinbefore described.

Having now described my invention, what I claim as new and desire to secure by Letters Patent, is:—

1. In a fluid pressure brake, the combination with a brake pipe and a reservoir, of an equalizing valve device having a main piston head subject to the opposing pressures of the brake pipe and a chamber and a differential piston head subject on one side to reservoir pressure and having means for supplying fluid to said chamber in the release position of said equalizing valve device.

2. In a fluid pressure brake, the combination with a brake pipe and a reservoir normally charged with fluid under pressure, of valve means for controlling the release of the brakes, a piston device for operating said valve means comprising a main piston head subject to the opposing pressures of the brake pipe and a chamber and a differential piston head subject on one side to reservoir pressure, and means for supplying fluid under pressure to said chamber in the release position of the parts for shifting the parts to close the brake cylinder exhaust.

3. In a fluid pressure brake, the combination with a brake pipe, brake cylinder, and a reservoir normally charged with fluid under pressure, of an equalizing valve device comprising valve means for controlling the release of fluid from the brake cylinder, a piston device subject to the opposing pressures of the brake pipe and reservoir, comprising a main piston head and a differential piston head of less area, for operating said valve means, and means for supplying fluid under pressure to the intermediate chamber formed by said piston heads in the release position of the parts.

4. In a fluid pressure brake, the combination with a brake pipe, brake cylinder, and a reservoir normally charged with fluid under pressure, of an equalizing valve device comprising valve means for controlling the release of fluid from the brake cylinder, a piston device for operating said valve means comprising a large piston head subject on its outer face to brake pipe pressure and a small piston head subject on its outer face to reservoir pressure, and means for supplying fluid under pressure to the intermediate chamber formed by said piston heads in the release position of the parts.

5. In a fluid pressure brake, the combination with a brake pipe and a reservoir normally charged with fluid under pressure, of valve means for controlling the release of the brakes, a piston device having differential piston heads subject to the opposing pressures of the brake pipe and said reservoir for operating said valve means, and means for venting fluid under pressure to the intermediate chamber formed by said piston heads in the release position of the parts.

6. In a fluid pressure brake, the combination with a brake pipe and a reservoir normally charged with fluid under pressure, of valve means for controlling the release of the brakes, a piston device having differential piston heads subject to the opposing pressures of the brake pipe and said reservoir for operating said valve means, restricted feed grooves for respectively charging the intermediate valve chamber formed by said heads from the brake pipe and the reservoir from said valve chamber in the release position, and means for venting fluid under pressure to said chamber in the release position for shifting the parts to cut off the release of fluid from the brake cylinder.

In testimony whereof I have hereunto set my hand.

WALTER V. TURNER.

Witnesses:
A. M. CLEMENTS,
HOWARD J. BRUSH.

Copies of this patent may be obtained for five cents each, by addressing the "Commissioner of Patents, Washington. D. C."